Jan. 31, 1961     C. DE GANAHL     2,969,812
PIPE STRUCTURE
Filed Feb. 29, 1956
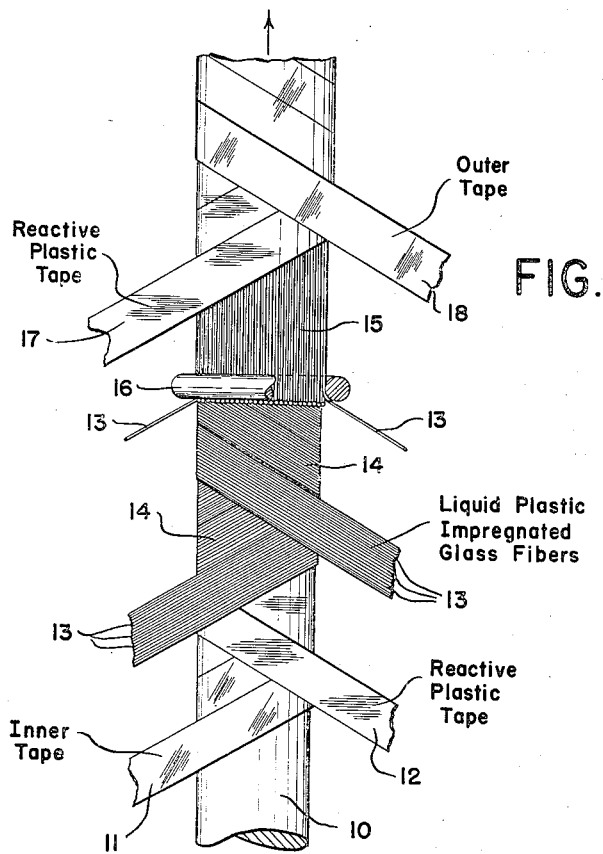
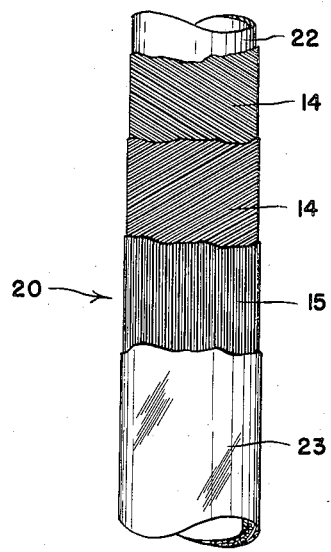
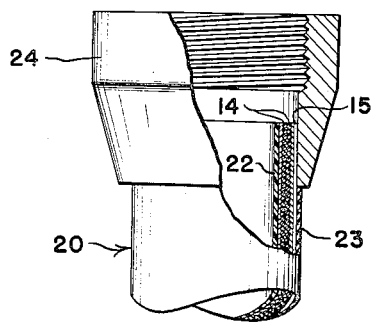
INVENTOR
Carl de Ganahl
BY
ATTORNEYS

United States Patent Office 2,969,812
Patented Jan. 31, 1961

2,969,812

PIPE STRUCTURE

Carl De Ganahl, Greenlawn, N.Y. (% Spiral Glas Pipe Company, 47 Bayard St., New Brunswick, N.J.)

Filed Feb. 29, 1956, Ser. No. 568,601

3 Claims. (Cl. 138—25)

This invention relates to glass fiber reinforced plastic pipe and is a continuation-in-part of the invention described in my copending application Serial No. 235,646, filed July 7, 1951, now Patent 2,747,616, issued May 29, 1956.

In my copending application I have described a plastic pipe structure which comprises essentially a multiplicity of glass fiber rovings or equivalent reinforcing elements bonded together by and substantially embedded in a monolithic and substantially impervious hollow cylindrical body of plastic material (i.e., the wall of the plastic pipe). The glass fiber rovings are disposed in the pipe wall both helically and longitudinally with respect to the longitudinal axis of the pipe so that the circumferential or hoop strength of the pipe is substantially equal to the axial or longitudinal strength of the pipe. Moreover, I have also found it advantageous to incorporate in the plastic pipe structure an inner lining of a relatively inert plastic material which is securely bonded to the inside of the portion of the pipe structure through which the reinforcing fibers extend. The resulting glass fiber reinforced pipe possesses exceptionally high strength for its weight and has found wide use where the resistance of the pipe to chemical attack is of importance.

Plastic pipe of the type described is fabricated by applying a multiplicity of glass fiber rovings coated and impregnated with an uncured liquid plastic composition about a pipe-forming mandrel, the plastic impregnated rovings being applied about the mandrel in a plurality of concentric layers of rovings to build up a pipe wall of the desired thickness. As the individual glass fiber rovings are laid on the mandrel, the liquid plastic composition thereon runs together with the liquid plastic on adjoining rovings, and with liquid plastic on underlying and overlying layers of rovings, to form a coherent and continuous body of liquid plastic through which the glass fiber rovings extend. This coherent body of liquid plastic is then treated to cure the plastic composition and thus form the desired glass fiber reinforced plastic pipe. As noted hereinbefore, the glass fiber rovings are applied to the mandrel so that they are disposed both helically and axially (i.e. longitudinally) with respect to the longitudinal axis of the finished pipe. Because the axially disposed rovings do not inherently possess any component of strength in a radial or circumferential direction, they cannot be applied to the mandrel so that they by themselves become bound to the mandrel (prior to curing the liquid plastic composition). Therefore, to bind the axially disposed rovings to the mandrel, it has been the practice to apply one or more layers of helically wound rovings over the outermost layer of axial rovings. Indeed, because of convenience in the manufacturing process and in the supposed interest of obtaining pipe having maximum strength and homogeneity, it has been the practice to apply the axially disposed rovings so that they are, or are adjacent to, the innermost layers of the glass fibers in the pipe structure.

Pipe constructed as described possesses the aforementioned favorable strength to weight ratio and, particularly when provided with a vinyl-containing plastic inner lining, is highly resistant to the corrosive effects of most organic and inorganic liquids to which the pipe is exposed during its service life. However, despite the greatest care in its manufacture, the pipe occasionally exhibits a tendency to "delaminate"; that is, a tendency for the plastic material to become physically detached from the layers of reinforcing fibers that extend through the plastic pipe wall. This delamination or separation usually occurs above or below the layer (or layers) of axially disposed rovings which underlie, or lie between, the several layers of helically disposed rovings. The thickness of this separation is very small; but, nonetheless when it occurs it forms a serious interruption in the continuity of the plastic body of the pipe. In addition to this occasional tendency of the pipe to delaminate, difficulty has also occasionally been experienced in obtaining a secure bond between the plastic pipe body and the plastic inner lining of the pipe, and between the plastic pipe body and the plastic pipe fittings used to connect sections of pipe together and to other apparatus. In particular, it has been difficult to obtain a bond between the pipe and pipe fittings the axial strength of which is at all comparable with the axial strength of the pipe itself. As a result of these difficulties, the performance and usefulness of the pipe has been less than that which could be expected of such pipe.

I have now found that I can obtain a surprisingly great improvement in the strength, performance and adaptability of the aforementioned pipe by means of a relatively simple yet unobvious modification in the construction of the pipe. Namely, I have found by positioning the layers of axially disposed fibers in the pipe wall so that they comprise the outermost of all of the concentric layers of fibers, the undesirable tendency of the pipe wall to delaminate is almost completely if not entirely eliminated. Moreover, in the resulting plastic pipe the bond obtained between the plastic pipe wall and the plastic inner lining, and the bond that can be obtained between the pipe and pipe fittings, is greatly improved. The reasons for the substantially complete elimination of delamination, for the improved bond between the plastic pipe body and plastic inner liner, and for the improved bond between the pipe and pipe fitting and the increased longitudinal strength of the latter bond, insofar as they are understood, will be brought out in the ensuing description of my invention.

Accordingly, the plastic pipe structure of my invention comprises a multiplicity of glass fiber rovings bonded together by and substantially embedded in a monolithic and substantially impervious hollow cylindrical body of plastic material. The rovings are disposed in said monolithic body of plastic material in a plurality of concentric layers of rovings. A plurality of said concentric layers of rovings are made up of rovings that are helically disposed in said monolithic body of plastic, and at least one other of said layers of rovings is made up of rovings that are disposed axially in said body of plastic material substantially parallel to the axis of the pipe, the layer of axially disposed rovings being the outermost of the several concentric layers of rovings in the pipe wall. As a direct consequence of this pipe structure, the tendency of the pipe wall to delaminate is substantially completely eliminated, and the bond between plastic pipe body and inner liner and between pipe and pipe fittings is greatly strengthened. As a result of the improvement in strength and performance of the pipe, it can now be employed under even more severe service conditions than heretofore possible without fear of failure of the pipe.

My invention will be better understood from the following description, in conjunction with the accompanying drawing of which Fig. 1 shows the method of making pipe pursuant to my invention;

Fig. 2 is a cutaway view of the glass fiber reinforced plastic pipe of my invention; and Fig. 3 is a view, half in section, of my plastic pipe with a typical pipe fitting attached thereto.

In the manufacture of my improved plastic pipe a pipe-forming mandrel 10 is advanced upwardly advantageously through the central openings of a number of rotatable annular tables (not shown in the drawing) from which tables the various elements or components that make up the pipe structure are successively dispensed. As shown in Fig. 1, a layer of parting tape 11 is first advantageously applied about the mandrel to prevent the subsequent layers of reactive plastic materials from sticking to the mandrel when these plastic materials are subsequently cured. The layer of parting tape 11, of course, must be inert with respect to the reactive plastic materials subsequently applied thereover and, therefore, advantageously is formed of cellophane or "Mylar" (polyester terephthalate) film. To provide an impervious plastic inner lining for the pipe, a layer of a reactive plastic material, preferably in the form of a tape 12, is applied about the layer of parting tape 11. The reactive plastic tape 12 is advantageously fabricated from a calendered film of a plastic composition containing from 40%-75% by weight of thermoplastic vinyl polymers (e.g., polymers and copolymers of vinyl chloride, vinyl acetate, vinylidene chlorine, and the like) plasticized with a reactive plastic material such as partially polymerized thermosetting epoxy resins. The vinyl polymer content of the tape 12 contributes strength and body to the uncured film from which the tape is made, and contributes importantly to the imperviousness and resistance to chemical attack of the cured plastic pipe. The reactive plastic constituent of the tape 12 must, of course, be compatible with the vinyl content of the tape, and must also be capable of forming a secure bond with the liquid plastic composition on the glass fiber rovings subsequently applied thereover. (The pipe structure can also advantageously include an innermost layer of vinyl polymers plasticized with a non-thermosetting material such as dioctyl phthalate or with a thermoplastic material such as nitrile (Buna N) rubber. However, as the present invention is not specifically concerned with the inclusion of such a layer in the pipe structure, the fabrication of a pipe having this innermost vinyl-containing layer is not described herein.)

After the inner tape 11 and the reactive plastic tape 12 (if any) have been applied to the upwardly advancing mandrel, a multiplicity of multifilament glass fiber rovings 13 coated and impregnated with an uncured liquid plastic composition are then applied about the mandrel 10. As used herein the term "rovings" includes threads, yarns and equivalent textile elements, as well as untwisted or slightly twisted bundles of substantially parallel fibers or filamnets. The liquid plastic composition on the roving is advantageously an uncured alkyd polyester or epoxy resin composition and, in the event that the pipe structure includes the aforementioned inner lining of reactive plastic tape, must be one that will become securely bonded (as, for example, by copolymerization) to the reactive plastic tape 12 when the liquid plastic composition and the reactive plastic material of the tape are subsequently cured.

The liquid plastic impregnated rovings 13 are applied about the mandrel in a plurality of concentric layers of rovings, the liquid plastic on individual rovings running together with the liquid plastic on adjoining rovings in the same layer, and with the liquid plastic on underlying and overlying layers of rovings, to form a continuous, coherent body of liquid plastic through which the several layers of rovings extend. In accordance with my invention, a plurality of the concentric layers of plastic impregnated rovings are applied about the mandrel so that the rovings of these layers 14 are helically disposed, and at least one more of the concentric layers of rovings are applied so that the rovings of this layer 15 are axially disposed with respect to the axis of the mandrel. As shown in Fig. 1, the rovings of at least one of the helically disposed layers 14 are applied to the mandrel so that the pitch of the rovings is opposite in direction (and advantageously equal in magnitude) to the pitch of the rovings of at least one other of the layers 14 of helically disposed rovings. Moreover, the layer or layers 15 of axially disposed rovings are laid on the mandrel so that the axial rovings comprise the outermost of the concentric layers of rovings.

In order to lay the axially disposed rovings of the layer 15 on the mandrel so that they will closely contact the underlying pipe structure, the axial rovings are advantageously brought into close proximity with the said underlying pipe structure by means of a guide ring 16 (shown partly in section) the inside diameter of which is only slightly greater than the external diameter of the plastic pipe. After all of the concentric layers of rovings have been applied to the mandrel 10, an outer layer of a reactive plastic tape 17, preferably having the same composition as the tape 12, is advantageously wrapped helically about the outermost layer 15 of axial rovings to form an impervious outer sheath thereover when the pipe is cured. Finally, after the several layers of uncured plastic materials have been applied to the mandrel in the manner described, an outer layer of an inert tape 18, such as the cellophane or "Mylar" tape hereinbefore referred to, is advantageously wrapped about the mandrel to retain the plastic materials in place on the mandrel until the plastic is cured.

After the various components of the pipe structure have been applied to the mandrel 10, the mandrel with the plastic materials thereon is heated or otherwise treated to cure the reactive plastic tape and the liquid plastic composition. When the liquid plastic composition is cured the aforementioned coherent and continuous body of liquid plastic becomes a monolithic plastic structure through which extend the concentric layers of reinforcing glass fiber rovings. Simultaneously, the plastic composition on the glass fiber rovings becomes securely bonded to the reactive plastic material of the inner reactive plastic tape 12 and outer reactive plastic tape 17 which advantageously comprises the impervious inner lining and outer sheath of the plastic pipe structure. The type of treatment required to cure the plastic materials of the pipe, and the length of time required for this treatment, of course will vary with the type of plastic material employed in the fabrication of my plastic pipe. By way of example, I have found that when the uncured liquid plastic composition comprises an alkyl polyester resin and the reactive plastic tape comprises a calendered film of vinyl polymers plasticized with an uncured epoxy resin, the plastic materials are cured and a secure bond between the plastic pipe body and the inner lining is developed if the plastic materials are heated on the mandrel at a temperature of 300-350° F. for a period of about thirty minutes. The cured plastic pipe can then be removed from the mandrel 10 and the inner and outer tapes 11 and 18 removed from the cured pipe. However, to develop the maximum strength of the pipe structure, the cured pipe is advantageously subjected to a post-cure heat treatment of about three hours at the curing temperature.

As shown partially cut away in Fig. 2, the resulting plastic pipe 20 comprises a monolithic hollow cylindrical plastic pipe body through which extend a plurality of concentric layers of glass fiber rovings. The layers of glass fiber rovings comprise the inner layers 14 of helically disposed rovings and the outermost layer (or layers) 15 of axially disposed rovings. In addition, the plastic pipe structure advantageously includes an impervious inner lining 22 and outer sheath 23 that are securely bonded, as by copolymerization, to the monolithic plastic pipe body through which the reinforcing elements extend. As pointed out hereinbefore, the inner lining 22 and outer sheath 23 contain from 40% to 75% by weight of thermoplastic vinyl polymers and hence exhibit a high degree of resistance to chemical attack and physical erosion attributable to the fluids carried by the pipe.

Plastic pipe constructed as described is substantially completely free from the defects and difficulties described hereinbefore in connection with prior art pipe of this type. Delamination (the separation of the several layers of glass fiber reinforcing elements in the monolithic plastic pipe wall) apparently occurs at those points in the pipe wall where the plastic material is insufficiently reinforced against the radial stresses resulting from internal pressure or pressure surges inside the pipe. However, as indicated herein, I have found that by positioning the axially disposed rovings outside all of the layers of helically disposed rovings, the tendency of the pipe to delaminate is substantially completely eliminated. In addition, the improved bond between the monolithic plastic pipe body through which the reinforcing fibers extend and the plastic inner lining of the pipe that is obtained when the axially disposed rovings are the outermost of the several concentric layers of rovings in the pipe structure is also apparently attributable to the difference in radial strength between the axially and the helically disposed rovings. Finally, as indicated herein, the positioning of the layer 15 of axially disposed rovings as the outermost of the several layers of rovings in the pipe structure greatly enhances the longitudinal strength of the bond that can be obtained between the plastic pipe and pipe fittings used to connect lengths of pipe to each other or to other apparatus. Moreover, when a fitting 24 is attached to the pipe 20 by means of a suitable adhesive, and when the pipe 20 is provided with an impervious plastic outer sheath 23, it is advisable to strip or cut away the outer sheath adjacent the end of the pipe, as shown in Fig. 3, in order to minimize the distance separating the inner surface of the fitting 24 from the outermost layer 15 of axially disposed rovings.

It will be seen from the foregoing description of my invention that I have devised an important improvement in the structure of glass fiber reinforced plastic pipe that contributes significantly to the increased usefulness and strength of the pipe.

I claim:

1. A pipe structure comprising a multiplicity of glass fiber rovings bonded together by and substantially embedded in a monolithic and substantially impervious hollow cylindrical body of plastic material, said rovings being disposed in said monolithic body of plastic material in a plurality of concentric layers of rovings, the rovings of at least one of said layers being disposed helically in one direction in said body of plastic material, the rovings of at least one other of said layers being disposed helically in the opposite direction in said body of plastic material, and the rovings of at least one more of said layers being disposed axially substantially parallel to the axis of said pipe, said layer of axially disposed rovings being the outermost of said concentric layers of rovings, said monolithic plastic pipe structure having a substantially impervious plastic inner lining securely bonded thereto, said inner lining containing from about 40% to 75% by weight of thermoplastic polymers, said pipe having a pipe fitting on at least one end thereof directly bonded to said axially disposed rovings of said outermost layer adjacent the end of the pipe.

2. A pipe comprising a multiplicity of glass fiber rovings bonded together by and substantially embedded in a monolithic and substantially impervious hollow cylindrical body of plastic material, said rovings being disposed in said monolithic body of plastic material in a plurality of concentric layers of rovings, the rovings of at least one of said layers being disposed helically in one direction in said body of plastic material, the rovings of at least one other of said layers being disposed helically in the opposite direction in said body of plastic material, and the rovings of at least one more of said layers being disposed axially substantially parallel to the axis of said pipe, said layers of axially disposed rovings being the outermost of said concentric layers of rovings, said monolithic plastic pipe structure having a substantially impervious plastic inner lining and a substantially impervious plastic outer sheath securely bonded thereto, said inner lining and said outer sheath containing from about 40% to 75% by weight of thermoplastic polymers, said pipe having a pipe fitting on at least one end thereof directly bonded to said axially disposed rovings of said outermost layer of rovings adjacent the end of the pipe.

3. A glass fiber reinforced plastic pipe comprising a multiplicity of glass fiber rovings bonded together by and substantially embedded in a monolithic and substantially impervious hollow cylindrical body of plastic material, said rovings being disposed in said monolithic body of plastic material in a plurality of concentric layers of rovings, the rovings of at least one of said layers being disposed helically in one direction in said body of plastic material, the rovings of at least one other of said layers being disposed helically in the opposite direction in said body of plastic material, and the rovings of at least one more of said layers being disposed axially substantially parallel to the axis of said pipe, said layer of axially disposed rovings being the outermost of said layers of rovings, said pipe having a pipe fitting on at least one end thereof directly bonded to said axially disposed rovings of said outermost layer adjacent the end of the pipe.

References Cited in the file of this patent

UNITED STATES PATENTS

| | | |
|---|---|---|
| 1,242,903 | Angier | Oct. 16, 1917 |
| 2,027,961 | Currie | Jan. 14, 1936 |
| 2,467,999 | Stephens | Apr. 19, 1949 |
| 2,612,910 | Krupp | Oct. 7, 1952 |
| 2,664,373 | Reilly | Dec. 29, 1953 |
| 2,690,769 | Brown | Oct. 5, 1954 |
| 2,749,643 | Scott | June 12, 1956 |
| 2,782,806 | Stambaugh et al. | Feb. 26, 1957 |
| 2,815,043 | Kleiner et al. | Dec. 3, 1957 |

FOREIGN PATENTS

| | | |
|---|---|---|
| 588,858 | Great Britain | June 4, 1947 |
| 1,077,197 | France | Apr. 28, 1954 |